April 14, 1959 — M. V. RICCIUS — 2,881,631

ARTIFICIAL FEEL MECHANISM

Filed Nov. 15, 1956 — 2 Sheets-Sheet 1

INVENTOR.
Merril V. Riccius
BY
William R. Robertson
AGENT

INVENTOR.
Merril V. Riccius
BY William R. Robertson
AGENT

United States Patent Office 2,881,631
Patented Apr. 14, 1959

2,881,631

ARTIFICIAL FEEL MECHANISM

Merril V. Riccius, Dallas, Tex., assignor to Chance Vought Aircraft, Incorporated, Dallas, Tex., a corporation of Delaware Application November 15, 1956, Serial No. 622,489

5 Claims. (Cl. 74—470)

This invention relates to a mechanism for imposing a predetermined counterforce on an object in consequence of enforced movement of the latter from a neutral position, and more particularly to an artificial feel mechanism associated with a control element through a linkage whose motions effect adjustment of a power control operable for deflecting a control surface of an aircraft, said feel mechanism being operable for introducing into said linkage forces resisting, by predetermined amounts, movements of said control element from a neutral position thereof.

In aircraft equipped with attitude control systems in which a pilot's control element such as a control column, stick, or rudder pedals is directly connected through a linkage comprising pushrods, cables, lever arms, etc. to a control surface such as an elevator, aileron, or rudder, aerodynamic forces applied to the control surface when the latter is deflected from a neutral position are fed back through the linkage to the pilot and provide him with what are commonly termed "feel forces." Feel forces engendered in such a manner are very desirable and important to the pilot in flying the aircraft since their magnitude at any instant tends to be proportional to the current amplitude of deflection of an associated control surface from its neutral position. By sensing the relative magnitude of the force he exerts at any given point in time in preventing movement of a control element toward its neutral position, a pilot is able to estimate the current position of the control surface to which the control element is connected.

Because of the prohibitively high forces which would have to be exerted on a control element for moving a control surface during flight in an aircraft which flies at relatively high speeds and/or whose control surfaces are comparatively large, many aircraft presently employ power control systems in which an actuator, controlled by motion of a pilot's control element transmitted through a linkage to a unit governing operation of the actuator, is linked to one or more control surfaces and exerts all the forces required for positioning the latter as dictated by the varying demands of flight. The forces exerted by the pilot in moving the linkage connecting his control element to the power control unit are generally small, and interaction between the stick or other control element and the control surface is usually entirely eliminated; hence, feel forces whose magnitudes are proportional to control surface deflections are generally completely lacking. In consequence, it would readily be possible for the pilot to cause unwittingly the application of destructively large aerodynamic loads on the aircraft, especially at high speeds, by excessively deflecting one or more control surfaces.

To re-establish a sense of feel in the controls, resort has been made to various devices producing a so-called "artificial" feel. Many of these devices have served more or less efficiently in their intended capacities, but they have tended to be complicatedly constructed from relatively numerous moving parts and consequently have tended to introduce considerable friction into the control system and to be more weighty and expensive and less direct and uniform in operation than might be desired.

Although in some cases it is desirable that the pattern of feel forces imposed upon the control element within its range of deflection to one side of its neutral position be symmetrically equal and opposite to that imposed within its range of deflection to the opposite side of the neutral position, in other cases it may be desirable to effect an asymmetrical introduction of feel forces. For instance, since some aircraft cannot withstand as high negative as positive "g" loadings, it is usually more readily possible to overload such an aircraft by a forward rather than by a rearward movement of the stick or control column. It sometimes is desirable, therefore, to increase nose-down feel forces applied to the control element over corresponding forces applied when the control element is positioned to bring the aircraft to a nose-up attitude. In other cases, the geometry or other features of the design of the linkage connecting the control element and the power control may be such that frictional or other forces generated in the linkage and/or in interconnected items other than the artificial feel mechanism tend to produce more resistance to movement of the control element in one rather than in another direction from its neutral position. An asymmetrical feel may thus be produced which may, in a particular case, be undesirable since it may supply fallacious indications of control surface loadings to the pilot. Thus, it sometimes is of distinct benefit to introduce forces into the linkage which will neutralize such asymmetry of feel as may be introduced by the linkage and to supply a desired feel pattern which is symmetrical on each side of the neutral position of the control element.

It is, accordingly, a major object of this invention to provide a mechanism for introducing artificial feel forces into a linkage connecting a pilot's control element to a power control unit operative for bringing about movement of a control surface of an aircraft.

Another object is to provide a mechanism such as stated above which, in response to a movement of the linkage connected to a pilot's control element away from a neutral position thereof, urges return of the linkage, hence of the control element, to its neutral position with a force increasing in proportion to the amplitude of displacement of the linkage from said neutral position.

A further object is to provide a mechanism such as thus far stated in which movement of the control linkage in one direction away from a neutral position thereof is resisted with a force of different magnitude from that exerted by the mechanism in opposition to an equal movement of the linkage in another direction from its neutral position.

Yet another object is to provide an artificial feel mechanism which is simply and inexpensively constructed, relatively light in weight, and low in friction.

Other objects and advantages will be apparent from the specification and claims and from the accompanying drawings which illustrate an embodiment of the invention.

Briefly described, the invention comprises first and second members movably mounted on an aircraft. Each of these movable members has a respective neutral position from which it is movable in only one direction. Thus, the first movable member is movable from its neutral position in a first direction, while corresponding movement of the second movable member can only be affected in another, second direction. These motions of the movable members are reversible for returning each of the above members to its neutral position. Stops, at least one of which may be adjustable, are provided to prevent reverse rotation of the first and second members past their respective neutral positions. Connection is effected of resilient means between the first and second members for resisting any movement of either from a neutral position with a force that increases in proportion to the amplitude of the movement. A linkage connects a pilot's control element of the aircraft in which the feel mechanism is installed with a power control unit which, as regulated by movement of the control element, effects positioning of a control surface to which an actuator governed by the unit is connected. The linkage carries striking surfaces which, depending upon the direction of movement of the linkage, selectively force the first and second movable members from their neutral positions when the control element is displaced from neutral. Thus, movement of the linkage in a first direction effects displacement of the first movable member from its neutral position against resistance exerted by the resilient means, and the second movable member is left against its stop. Movement of the linkage in a second direction effects similar displacement of the second movable member while leaving the first movable member positionally unaffected. The first and second movable members may conveniently take the form of a first pair of idlers pivotally mounted on the aircraft and joined at their otherwise free ends by the resilient means. The striking surfaces carried by the linkage may be provided in a number of ways, such as by bolts or fingers carried by the linkage. In a preferred embodiment, the striking surfaces may be provided as follows: where a rigid member of the linkage in connection with which the mechanism operates is adapted for axial movement on each side of a neutral position, an idler may be provided at each end of the rigid member. One of the idlers may be arranged in a manner wherein one of its surfaces bears against a respective first or second movable member when the linkage is moved in a particular direction from its neutral position, and the other idler may similarly be arranged relative to the other movable member. Where the mechanical advantage had by the linkage in displacing the first movable member from its neutral position is the same as when similarly displacing the second movable member, the feel force gradients experienced when moving the control element to either side of neutral will be the same. When this mechanical advantage is changed so that it is greater when moving the linkage in one rather than in the other direction, the feel force gradients in the two directions will be unequal. Forms of the invention in which feel force gradients are thus made to be greater when the control element is moved toward one rather than the other side of its neutral position are fully explained in the course of the detailed description below of an embodiment of the invention and of two modifications thereof.

In the description of the drawings and in the detailed description below, relative terms such as a "vertical," left-hand," and "inner," etc. are applied to elements of the invention and to related parts of the aircraft. Such application is made solely for convenience in providing a clear and simple description of the parts of an embodiment of the invention and of their relations to each other and the aircraft in which they are utilized, and it will be understood that the parts of the invention are by no means limited to the orientations shown and described. Such orientations may be expected to vary as required for best installation and operation of the artificial feel mechanism in association with any specific control linkage.

Figure 1:
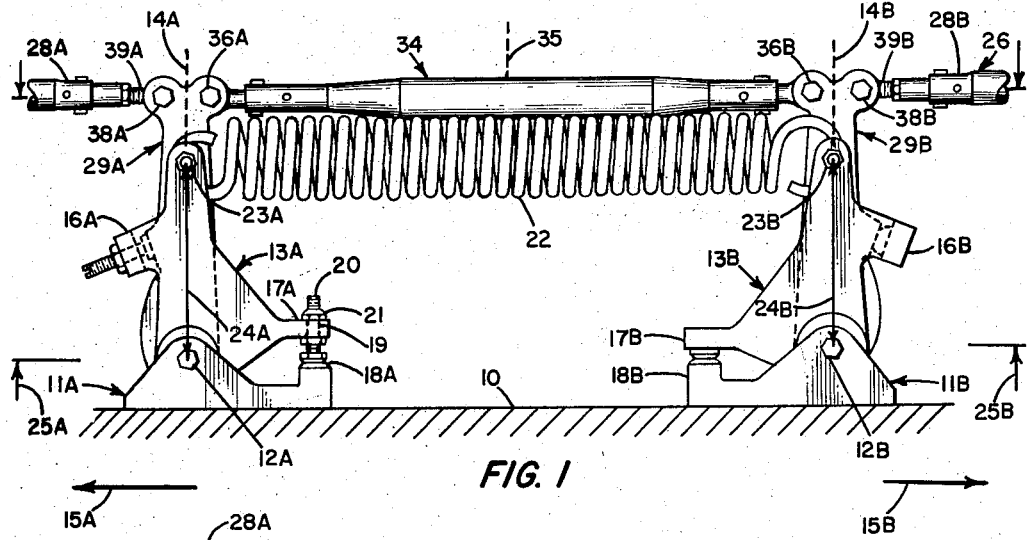
Figure 1 is a side elevational view of the artificial feel mechanism together with interconnected parts of the control linkage, the mechanism being shown in its neutral position corresponding to a neutral position of the linkage.

With reference now to Figure 1, a fixed structural (airframe) member 10 of an aircraft rigidly supports a spaced-apart pair of fixed, upwardly extending bodies 11A, 11B. The fixed body 11A lying, as shown in the referenced illustration, on the left has pivotally attached thereto by a pin or bolt 12A a first movable body comprising an upwardly extending idler 13A. A second movable body or idler 13B is similarly mounted by a pin or bolt 12B on the right-hand fixed body 11B. Each of these idlers 13A, 13B has a respective neutral position 14A or 14B which for convenience may be designated as a position occupied by the idler when it is extending approximately vertically. The first or left-hand idler 13A is pivotable on the bolt 12A within a range extending in a first direction 15A (to the left) from its neutral position, and the second or right-hand idler 13B is correspondingly pivotable in a second direction 15B (to the right) from its neutral position. The first and second idlers 13A, 13B each preferably have respective, generally horizontally extending arms 16A, 16B whose form and function will be more fully described in later paragraphs. Reverse pivoting of the first and second idlers 13A, 13B beyond their respective neutral positions 14A, 14B is obviated by stops which will now be described.

Two stop devices are provided, each stop comprising the combination of a rigid stop arm 17A or 17B integral with or rigidly attached to a respective idler 13A or 13B and extending inwardly of the mechanism therefrom, each arm 17A or 17B being associated with a fixed boss 18A or 18B aligned therewith and extending upwardly from a respective fixed body 11A, 11B. The boss 18B of the second fixed body 11B is struck by the second idler's stop arm 17B when the latter is pivoted to the left to its neutral position 14B, which position thus is defined by the point at which stopping action takes place. The point at which the first idler's stop arm 17A contacts the first fixed body boss 18A, hence the location of the neutral position 14A, may be made adjustable by providing dimensional adjustability as a feature of either of the mutually contacting members. This may be accomplished, for example, by piercing the stop arm 17A with a generally vertical tapped hole 19 and threading into the latter a stop bolt 20 which may be locked, after axial adjustment of the same, by suitable means such as lock nuts 21. Where neutral-position adjustability is desired at the second idler 13B, a second stop bolt may similarly be provided on the second stop arm 17B.

The resilient means 22 is connected between the first and second movable members 13A, 13B and is operative for resisting any movement of each of the latter from its respective neutral position 14A or 14B with a force which increases in proportion to the amplitude of the particular movement. The resilient means 22 is connected to the otherwise free end of the first idler 13A as by a bolt 23A at a point which is separated by a first interval 24A from the pivot point, defined by the bolt 12A, of the first idler 13A. In the same fashion, the resilient means 22 is connected to the second idler 13B at a point separated by a second interval 24B from the pivot point of that idler. In the embodiment of the invention shown in Figure 1, the above-mentioned first and second intervals 24A, 24B are equal, and the resilient means 22 comprises a helical spring which preferably is stretched to some extent between the idlers 13A, 13B to provide, as will be explained, a force tending positively to hold the idler stop arms 17A, 17B against the bosses 18A, 18B. The spring rate of the resilient means should be such that feel forces of desired magnitudes will be introduced thereby when, as will be described, either the first idler 13A or second idler 13B is moved from its respective neutral position.

For purposes of the present description, it may be assumed that the aircraft in which the parts of the invention are installed is provided with suitable control surfaces; a power control mechanism comprising an actuator for positioning at least one of those surfaces and a unit, for example, a valve, for governing operation of the actuator; and a control element positionable by an operator of the aircraft for governing the operation of the valve, the actuator being connected to the one or more surfaces positioned thereby. The control element of course must be connected to the power control valve or equivalent unit, and this is effected by a linkage 26 whose components include a pushrod 34 connected between other linkage members 28A, 28B and supported by third and fourth idlers 29A, 29B. To supply feel forces at the control element, it is necessary for motion of the control element in one direction from its neutral position to be transmitted through the linkage 26 to one of the first pair of idlers 13A, 13B for effecting a corresponding movement of the latter from its respective neutral position, and an opposite motion of the control element must similarly affect the other idler 13A or 13B. This is readily achieved by constructing and arranging the linkage 26 in such manner that one surface of a component thereof bears against and enforces movement of an idler 13A or 13B when the control element is displaced in one direction, while another surface carried by the linkage 26 performs a corresponding function at the other idler 13A or 13B when the control element is oppositely moved. The arrangement should be such that only one idler 13A or 13B is moved at a time. A way in which these linkage surfaces may be provided is explained below.

The third idler 29A is pivotally secured on the aircraft near the first idler 13A and may conveniently be mounted on the first fixed body 11A by means of the same bolt 12A which mounts the first idler. The fourth idler 29B is similarly mounted with the second idler 13B by the bolt 12B on the second fixed body 11B. The third and fourth idlers 29A, 29B are each pivotable to the left and right of the neutral positions 14A, 14B of their respective, neighboring idlers 13A, 13B and in the example, as viewed in Figure 1, are installed on the bolts 12A, 12B on the far side of the first and second idlers.

Figure 2:
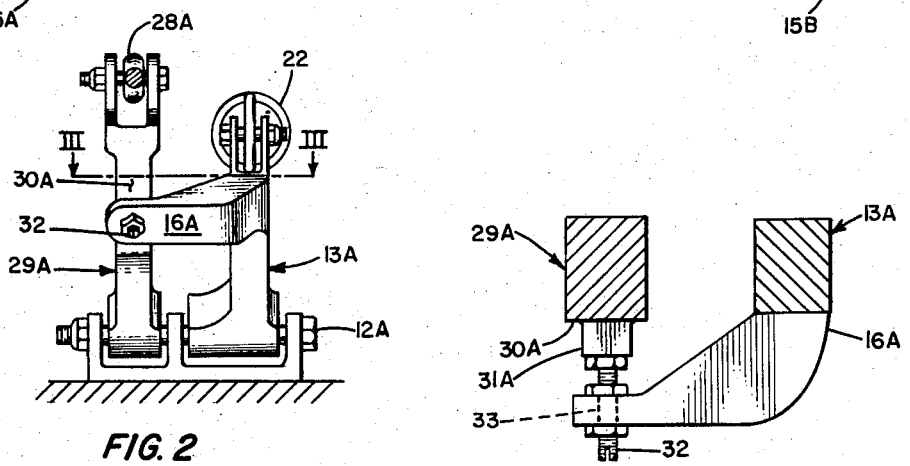
Figure 2 is a left-hand end elevational view of the artificial feel mechanism.
Figure 3:
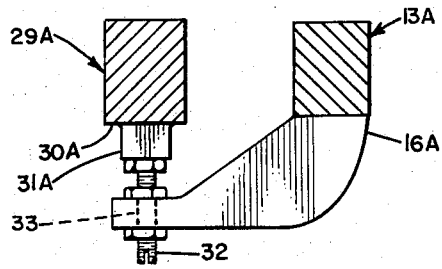
Figure 3 is a slightly enlarged, detailed view taken at line III—III of Figure 2, the line of view being perpendicular to the bolt of the arm provided on the first idler.

Referring to Figure 2, the arm 16A of the first idler 13A extends generally horizontally from the latter to a point aligned with the left-hand side or face 30A of the third idler 29A. As a consequence of this construction, a surface area of the third idler face 30A bears against the arm 16A and pivots the first idler 13A to the left when the third idler 29A is pivoted to the left. As illustrated in Figure 3, this face 30A of the third idler 29A may be provided with a boss 31A which projects toward the arm 16A and the latter may be provided with a bolt or other adjustable body 32 which extends toward and is contacted by the boss 31A. By making axial adjustment of the bolt 32 in the tapped hole 33 through which it pierces the idler arm 16A, variation may be effected of a point at which the first idler 13A (when at rest) is engaged by the third idler 29A when the latter, as seen in Figure 1, is pivoted to the left.

Figure 4:
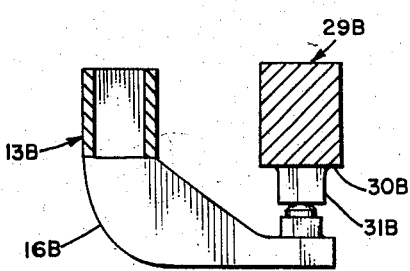
Figure 4 is a view similar to Figure 3 and taken from a corresponding point relative to the arm and boss of the idlers at the right-hand end of the mechanism, the idlers being partially cut away for simplicity of representation.

Corresponding in location and function and, except as noted, in form to the first idler arm 16A and third idler boss 31A shown in Figure 3, the arm 16B (Figure 4) provided on the second idler 13B is engageable by a boss 31B on the right-hand face 30B of the fourth idler 29B.

No means of effecting dimensional adjustment of the arm 16B or boss 31B is shown, but where such means is found desirable, the boss 31B or arm 16B may be provided with an adjustable member such as the bolt 32 (Figure 3) provided on the first idler's arm 16A.

The rod 34 (Figure 1), carried in the linkage 26, is a rigid member axially displaceable to the left and right by motion of the control element transmitted thereto through members of the linkage 26. The rod 34 has a neutral position 35 which corresponds to a neutral position of the linkage 26 and hence of the control element to which the linkage is attached. The rod 34 is connected by a pivot bolt 36A to the third idler 29A at a point separated by a third interval 25A from the pivot point, defined by the idler pivot bolt 12A, of the latter. At its other end, the rod 34 is pivotally attached by a bolt 36B to the fourth idler 29B at a point separated by a fourth interval 25B from the pivot point of the latter. In the example shown in Figure 1, the third and fourth intervals 25A, 25B are equal.

A linkage member 28A is connected to the third idler 29A by a bolt 38A at a point near the connection to that idler of the rod 34. Another linkage member 28B is connected in symmetrically similar manner to the fourth idler 29B. The linkage members 28A, 28B are respectively connected, directly or through still other linkage components not shown, to the pilot's control element and to the power control valve or equivalent unit provided in the aircraft. These connections may be reversed, where desired, without disturbing the effectiveness of operation of the feel mechanism. It is customary to rig or adjust the linkage 26 so that the control element is in its neutral position when the power control valve or equivalent regulated thereby is neutrally positioned. Means for effecting such adjustment may include axially adjustable end fittings 39A, 39B on the linkage members 28A, 28B connected to the third and fourth idlers 29A, 29B.

As pointed out above, the first and second intervals 24A, 24B (Figure 1) are equal, and the relationship of equality also exists between the third and fourth intervals 25A, 25B. The geometries at the two ends of the feel mechanism thus are symmetrical relative to each other. In some applications, the pattern of the desired feel forces may be of a sort which is best obtained by making the geometries of the two ends of the mechanism asymmetrical. This may be done in any one of a number of ways, all of which involve one or more changes in the relative lengths of the first, second, third, and fourth idlers 13A, 13B and 29A, 29B and/or in the locations of the points at which the rod 34, linkage members 28A, 28B, and spring 22 are attached thereto. Two examples of such modifications are given below.

Figure 6:
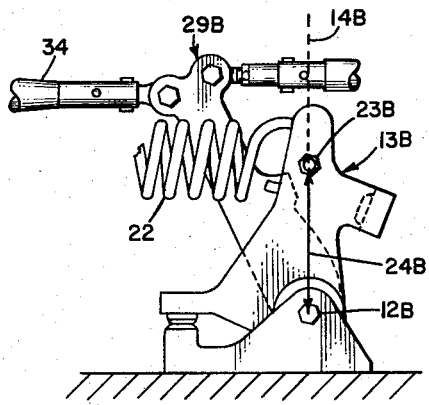
Figure 6 is a side elevational view of the right-hand end of the mechanism, the same being positioned as shown in Figure 5 for best representation of an alternate mode of connection of the resilient means.

Referring now to Figure 6, the omitted first and third idlers 13A, 29A and the connections thereto of the spring 22, rod 34, and linkage member 28A are assumed to be as described in connection with Figure 1. The fourth idler 29B also is as shown in Figure 1. The second idler 13B, however, is changed in that the second interval 24B (that is, the distance between the pivot point of the second idler 13B and the attachment point of the spring 22) has been reduced, and is not equal to the first interval 24A (Figure 1).

Figure 7:
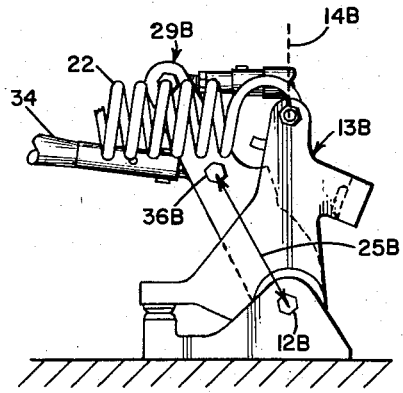
Figure 7 is a view similar to Figure 6 and showing an alternate mode of connection of the rigid member.

Again assuming the first and third idlers 13A, 29A and the attachments thereto to be the same as shown in Figure 1, reference is made to Figure 7 wherein the second idler 13B is the same as shown in Figure 1 and a shortening of the fourth interval 25B has been accomplished by locating the pivot bolt 36B of the rod 34 somewhat closer to the pivot bolt 12B of the idler 29B. As a consequence of this alteration, the fourth interval 25B is not equal to the second interval 25A (Figure 1).

Referring again to Figure 1, further description will be given of some of the spatial relations of the feel mechanism and an example will be provided of a procedure for adjusting the mechanism. With the linkage segments 28A, 28B disconnected from the third and fourth idlers 29A, 29B, the first idler's stop bolt 20 is axially adjusted (thereby pivoting the first idler 13A on its pivot bolt 12A) until the force required to disengage the second idler stop arm 17B from the second fixed body boss 18B is of a desired value. This adjustment establishes the neutral position 14A of the first idler 13A. With the second idler stop arm 17B held by the spring 22 against the fixed body boss 18B the linkage segment 28B extending between the power control valve and fourth idler 29B is rigged so that the second idler's horizontal arm 16B (Figure 4) is in contact with the fourth idler boss 31B and the power control valve positioned by the linkage 26 (Figure 1) is in its neutral position. The manner in which such rigging is achieved is not, for present purposes, of material importance, but could for instance be effected by appropriate adjustment of the end 39B of the linkage member 28B. Without moving the first and second idler stop arms 17A, 17B from the corresponding bosses 18A, 18B, the control element next is placed and held in its neutral position and the end 39A of the linkage element 28A is adjusted to pick up the bolt 38A. Finally, the bolt 32 (Figure 3) provided on the first idler's horizontal arm 16A is adjusted until it is in contact with the third idler boss 31A.

Figure 5:
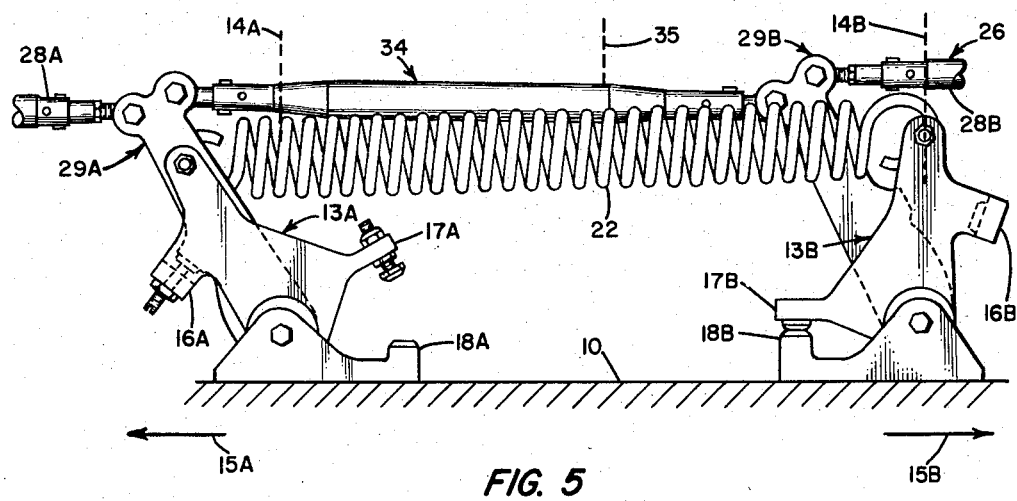
Figure 5 is a view similar to Figure 1 in which the linkage has been displaced to the left of its neutral position, thus effecting a corresponding displacement of parts of the feel mechanism.

When the pilot's control element is moved in a direction causing displacement of the rod 34 (Figure 1) to the left from its neutral position 35, the third idler 29A is rotated to the left and, since its boss 31A (Figure 3) is in contact with the bolt 32 provided on the horizontal arm 16A of the first idler 13A, the first idler 13A is also rotated to the left, as shown in Figure 5, against resistance offered by the spring 22. Since these motions are accompanied by rotation to the left of the fourth idler 29B, the fourth idler boss 31B (Figure 4) moves away from contact with the second idler arm 16B. Leftward rotation of the second idler 29B (Figure 5) and movement of the right-hand end of the spring 22 is prevented by the stop arm 17B of the second idler 13B, which rests against the second fixed body boss 18B. As a consequence, the spring 22 is stretched to a degree proportional to the movement of the pilot's control element. Disregarding friction in the linkage and other forces which might be imposed upon the linkage, deliberately or inadvertently, by agencies other than the artificial feel mechanism, the "feel" imparted to the control element is a function of the initial pulling force exerted on the first idler 13A, while the latter is in its neutral position, by the spring 22 plus the increase in tension in the spring which occurs as the first idler 13A is pivoted to the left. Its exact value depending on the behavioral characteristics of the particular spring 22, this increase depends upon and is proportional to the amplitude of the deflection of the first idler 13A from its neutral position 14A.

Movement of the control element connected to the linkage 26 in such manner as to displace the rod 34 toward the right of its neutral position 35 is accompanied by corresponding movements to the right of the second, third, and fourth idlers 13B, 29A, 29B and the right-hand end of the spring 22 while the first idler 13A, no longer engaged by the third idler 29A, remains in its neutral position 14A, thus holding the left-hand end of the spring 22 immobile. The concurrent stretching of the spring 22 introduces a feel force into the linkage 26 which will be found to increase at a rate proportional to the amplitude of deflection of the second idler 13B from its neutral position 14B.

The pilot thus is supplied with a continuous kinesthetic indication of the amplitude and direction of displacement of the linkage 26 (and hence of the power control and the control surface positioned thereby) from its neutral position 35. With the control element neutrally positioned, the spring 22 holds each of the stop arms 17A, 17B of the first and second idlers 13A, 13B against the associated fixed body bosses 18A, 18B with a force dependent upon the tension remaining in the spring 22 when the first and second idlers 13A, 13B are neutrally positioned. Before the control element can be moved in one direction from its neutral position, enough force must be applied to it to neutralize the spring force tending to hold one of the idlers 13A or 13B against a respective boss 18A or 18B, and an equivalent neutralizing force must correspondingly be applied to the control element before movement of the linkage 26 in the other direction from its neutral position 35 can be initiated. Such a force is commonly termed a "breakout force." Since a breakout force must be overcome by the pilot in moving the control element in either direction from neutral and since no feel force is introduced into the linkage 26 when the latter is in its neutral position 35, the pilot has a positive indication of the fact when the control element, hence the control surface governed thereby through the power control, is in its neutral position. Since the geometry of the left-hand end of the artificial feel mechanism is in exact correspondence with the geometry of the right-hand end, the breakout force is equal in either direction, the increase in feel force after breakout is proportional to control element displacement, and equal and opposite feel forces are introduced concurrently with equal and opposite displacements of the control element from its neutral position.

In Figure 6, the left-hand end portion of the artificial feel mechanism has been left unaltered, while the attachment point of the spring 22 has been altered as already described, thus shortening the previously defined second interval 24B and increasing the relative mechanical advantage of the control element over the spring 22 in connection with any movement to the right past their respective neutral positions which might be experienced by the rod 34 and second idler 13B (Figure 1). The breakout force requisite for initiation of such a movement is accordingly decreased, and since the bolt 23B (Figure 6) anchoring the right-hand end of the spring 22 moves through a smaller arc than before, a smaller increase in feel force accompanies a motion of the control element displacing the rod 34 a given distance to the right from its neutral position. No significantly perceptible changes in feel forces are experienced in connection with control element motions accompanying movement of the rod 34 to the left from its neutral position.

In Figure 7, the connection of the rod 34 to the fourth idler 29B has been relocated to effect a shortening of the fourth interval 25B. As a consequence, the relative mechanical advantage of the control element over the motion-resisting spring 22 is lessened as regards control element motions effecting displacement of the fourth idler 29B to the right. The breakout force and rate of increase in feel force associated with a movement of the control element for displacing the rod 34 to the right are accordingly increased, while the feel forces involved in an opposite movement of the control element remain substantially unchanged.

While only one embodiment of the invention has been shown in the accompanying drawings, it will be evident that various modifications are possible in the arrangement and construction in the artificial feel mechanism components without departing from the scope of the invention.

I claim:

1. For an aircraft having a linkage connecting a pilot's control element to a power control operable for deflecting a control surface of said aircraft, an artificial feel mechanism comprising: first and second, rigid, spaced-apart idlers pivotally mounted on said aircraft and having respective neutral positions, said first idler being pivotable in a first direction and said second idler being pivotable in a second direction away from said respective neutral position thereof; first and second stops rigidly mounted on said aircraft and operative for preventing pivoting of said first idler in said second direction and said second idler in said first direction beyond said respective neutral positions thereof; resilient means connected under tension between said first and second idlers and urging the same, respectively, against said first and second stops, movement of each of said first and second idlers away from said respective neutral position thereof being resisted by said resilient means with a force related to the amplitude of such movement; a rigid member of said linkage having a neutral position corresponding to a neutral position of said linkage, said rigid member being axially displaceable in said first and second directions from said neutral position thereof by motion of said linkage; third and fourth spaced-apart, rigid idlers pivotally mounted on said aircraft and interconnected by said rigid member, said third and fourth idlers being pivotable in said first and second directions by movement of said rigid member and being respectively engageable with said first and second idlers for pivoting said first idler away from said neutral position thereof when said rigid member is moved in said first direction away from said neutral position thereof and for pivoting said second idler away from said neutral position thereof when said rigid member is oppositely moved from said neutral position thereof.

2. A mechanism such as claimed in claim 1, said second idler being free of said fourth idler when said rigid member is moved in said first direction from said neutral position thereof, and said first idler being free of said third idler when said rigid member is moved, in said second direction, from said neutral position thereof.

3. A mechanism such as claimed in claim 1, at least one of said stops being adjustable for varying said neutral position of at least one of said first and second idlers.

4. A mechanism such as claimed in claim 1, said mechanism further comprising means carried by at least one of said idlers and dimensionally adjustable for varying a location at which said at least one of said idlers is engageable with another of said idlers.

5. For an aircraft having a linkage connecting a pilot's control element to a power control operable for deflecting a control surface of said aircraft, an artificial feel mechanism comprising: first and second, spaced-apart idlers, each of said idlers having an end pivotally mounted on said aircraft for rotation of said idler about a respective pivot axis, each of said idlers having a respective neutral position, said first idler being pivotable in a first direction and said second idler being pivotable in a second direction away from said respective neutral position thereof; first and second stops rigidly mounted on said aircraft and operative for preventing pivoting of said first idler in said second direction and said second idler in first direction beyond said respective neutral positions thereof; resilient means connected to said first idler at a point removed from said pivot axis thereof by a first interval and connected to said second idler at a point separated from said pivot axis thereof by a second interval; a rigid member carried in said linkage and having a neutral position corresponding to a neutral position of said linkage, said rigid member being axially displaceable in said first and second directions from said neutral position thereof by motion of said linkage; third and fourth, spaced-apart idlers each having an end pivotally mounted on said aircraft for rotation of said idler about a respective pivot axis, said rigid member being connected to said third idler at a point separated from said pivot axis thereof by a third interval and to said fourth idler at a point separated from said pivot axis thereof by a fourth interval, said third and fourth idlers being pivotable in said first and second directions by movement of said rigid member, said third idler being engageable with said first idler for pivoting the latter from said neutral position thereof when said rigid member is moved in said first direction from said neutral position thereof, and said fourth idler being engageable with said second idler for pivoting the latter from said neutral position thereof when said rigid member is moved in said second direction from said neutral position thereof, all said intervals having a relationship wherein, when said first interval is designated as corresponding to said second interval and said third interval to said fourth interval, one of said first and third intervals equals and the other differs in linear magnitude from its corresponding interval.

References Cited in the file of this patent
UNITED STATES PATENTS

| | | |
|---|---|---|
| 1,210,084 | Kotz | Dec. 26, 1916 |
| 1,221,761 | McGrew | Apr. 3, 1917 |
| 1,223,988 | Laughlin | Apr. 24, 1917 |
| 1,378,542 | Huffman | May 17, 1921 |
| 2,186,653 | Penote | Jan. 9, 1940 |
| 2,427,621 | Peterson | Sept. 16, 1947 |
| 2,439,356 | Arens | Apr. 6, 1948 |
| 2,531,764 | Binus et al. | Nov. 28, 1950 |
| 2,593,643 | Woolf | Apr. 22, 1952 |
| 2,625,050 | Kwasniewski | Jan. 13, 1956 |
| 2,756,610 | Hibband | July 31, 1956 |
| 2,780,427 | Keller et al. | Feb. 5, 1957 |